US011203252B2

United States Patent
Barnes et al.

(10) Patent No.: US 11,203,252 B2
(45) Date of Patent: Dec. 21, 2021

(54) STAGGERED ARROWHEAD RETENTION CLIP FOR A PRESSURE RELIEF ASSEMBLY

(71) Applicant: ILLINOIS TOOL WORKS INC., Glenview, IL (US)

(72) Inventors: Timothy M. Barnes, Leominster, MA (US); Lisa J. Aab, Flint, MI (US)

(73) Assignee: Illinois Tool Works Inc., Glenview, IL (US)

( * ) Notice: Subject to any disclaimer, the term of this patent is extended or adjusted under 35 U.S.C. 154(b) by 94 days.

(21) Appl. No.: 16/701,314

(22) Filed: Dec. 3, 2019

(65) Prior Publication Data

US 2020/0189359 A1 Jun. 18, 2020

Related U.S. Application Data

(60) Provisional application No. 62/781,260, filed on Dec. 18, 2018.

(51) Int. Cl.
  *B60H 1/24* (2006.01)
(52) U.S. Cl.
  CPC .................................. *B60H 1/249* (2013.01)
(58) Field of Classification Search
  CPC ..... A61M 2039/244; A61M 2039/2433; F16K 15/16; F16K 15/144; F16K 15/10; F16K 15/031; F16K 15/035; F04B 53/1037; F04B 39/1086; F04B 39/1073; B60H 1/249; B60H 1/24; B60H 1/248
  USPC ....................... 137/855, 512.15; 454/162, 70
  See application file for complete search history.

(56) References Cited

U.S. PATENT DOCUMENTS

| | | | |
|---|---|---|---|
| 2,579,395 | A | 12/1951 | Pfautsch |
| 2,770,833 | A | 11/1956 | Drechsel |
| 3,171,343 | A | 3/1965 | Wexler |
| 3,250,206 | A | 5/1966 | Strouth |
| 4,144,803 | A | 3/1979 | Gotz et al. |
| 4,667,578 | A | 5/1987 | Hagenah |
| 4,781,106 | A | 11/1988 | Frien |
| 4,899,647 | A | 2/1990 | Garries et al. |
| 5,105,731 | A | 4/1992 | Kraus |
| 5,105,849 | A | 4/1992 | Clough |
| 5,492,505 | A | 2/1996 | Bell et al. |

(Continued)

FOREIGN PATENT DOCUMENTS

| | | |
|---|---|---|
| CN | 203793076 U | 8/2014 |
| CN | 203937483 U | 11/2014 |

(Continued)

OTHER PUBLICATIONS

International Search Report and Written Opinion for PCT/US2016/066535 dated Mar. 16, 2017 (10 pages).

(Continued)

*Primary Examiner* — Vivek K Shirsat
*Assistant Examiner* — Ko-Wei Lin
(74) *Attorney, Agent, or Firm* — Quarles & Brady LLP (57) ABSTRACT

A pressure relief assembly includes a housing that comprises an air passage chamber and a membrane flap positioned within the air passage chamber. The pressure relief assembly further includes a plurality of clips that extend upwardly from the housing. The plurality of clips anchor the membrane flap to the housing. Further, the plurality of clips are staggered.

21 Claims, 7 Drawing Sheets

(56) References Cited

U.S. PATENT DOCUMENTS

| | | | |
|---|---|---|---|
| 5,591,080 | A | 1/1997 | Ward |
| 5,601,117 | A | 2/1997 | Lewis et al. |
| 6,210,266 | B1 | 4/2001 | Barton |
| 6,468,054 | B1 | 10/2002 | Anthony et al. |
| 7,077,742 | B2 | 7/2006 | Stevenson et al. |
| 7,204,472 | B2 | 4/2007 | Jones et al. |
| 7,503,843 | B1 | 3/2009 | Wilmoth |
| 8,328,609 | B2 | 12/2012 | Schneider |
| 8,360,104 | B2 | 1/2013 | Shereyk et al. |
| 8,672,734 | B2 | 3/2014 | Labrecque |
| 8,986,086 | B2 | 3/2015 | Carlson et al. |
| 9,321,326 | B2 | 4/2016 | Carlson |
| 9,440,511 | B2 | 9/2016 | Hofmann et al. |
| 9,849,754 | B2 | 12/2017 | Kim et al. |
| 2005/0003755 | A1 | 1/2005 | Koessler |
| 2008/0268763 | A1 | 10/2008 | Dippel |
| 2009/0068940 | A1 | 3/2009 | Bloemeling et al. |
| 2011/0097990 | A1 | 4/2011 | Charron |
| 2012/0329376 | A1* | 12/2012 | Liu .................... B60H 1/00678 454/152 |
| 2014/0242897 | A1 | 8/2014 | Rizzo et al. |
| 2014/0287675 | A1 | 9/2014 | Labrecque |
| 2016/0152114 | A1 | 6/2016 | Yamamoto |
| 2016/0222650 | A1* | 8/2016 | Kawai ....................... E04B 1/24 |
| 2018/0215236 | A1 | 8/2018 | Carlson |
| 2018/0361827 | A1 | 12/2018 | Carlson et al. |
| 2019/0032938 | A1 | 1/2019 | Wilding et al. |
| 2019/0186345 | A1* | 6/2019 | Joyce .................... F16K 15/063 |
| 2019/0270362 | A1 | 9/2019 | Bames et al. |

FOREIGN PATENT DOCUMENTS

| | | |
|---|---|---|
| CN | 105082939 A | 11/2015 |
| CN | 105966200 A | 9/2016 |
| DE | 3240291 A1 | 5/1984 |
| DE | 4322213 C1 | 6/1994 |
| DE | 19548551 A1 | 6/1997 |
| DE | 10 2006 056 868 A1 | 12/2008 |
| DE | 102008052303 A1 | 4/2010 |
| DE | 102013019520 A1 | 5/2015 |
| DE | 102015101229 A1 | 7/2016 |
| EP | 2050600 A2 | 4/2009 |
| FR | 2931396 A1 | 11/2009 |
| JP | 7-246831 A | 9/1995 |
| JP | 2003246214 A | 9/2003 |
| JP | 3647557 B2 | 5/2005 |
| JP | 2008126965 A | 6/2008 |
| KR | 20040025306 A | 3/2004 |
| WO | 2009070487 A1 | 6/2009 |
| WO | 2014175131 A1 | 10/2014 |
| WO | 2017079133 A1 | 5/2017 |
| WO | 2017/155637 A1 | 9/2017 |

OTHER PUBLICATIONS

International Search Report and Written Opinion for PCT/US2017/055083 dated Jan. 18, 2018 (14 pages).
Office Action for corresponding German Patent Application No. 10 2019 133 801.8 dated Jun. 29, 2020. (5 pages).
First Office Action from corresponding Chinese Patent Application No. 201680078203.X, dated Apr. 2, 2021 (16 pages) (English translation included).
"Machine Translation for FR2931396A1". 2021.
"Machine Translation for CN105966200A". 2021.
"Machine Translation for JP2003246214A". 2021.
"Machine Translation for JP2008126965A". 2021.
"Machine Translation of DE19548551A1". 2021.
"Machine Translation for DE3240291A1". 2021.
"Machine Translation for DE102013019520A1". 2021.
"Machine Translation for JP3647557B2". 2021.
"Machine Translation for DE102015101229A1". 2021.
"Machine Translation for KR20040025306A". 2021.

\* cited by examiner

STAGGERED ARROWHEAD RETENTION CLIP FOR A PRESSURE RELIEF ASSEMBLY

CROSS REFERENCE TO RELATED APPLICATIONS

This application is based on, claims priority to, and incorporates herein by reference in its entirety U.S. Provisional Application Ser. No. 62/781,260, filed on Dec. 18, 2018, and entitled "STAGGERED ARROWHEAD RETENTION CLIP FOR A PRESSURE RELIEF ASSEMBLY."

REFERENCE REGARDING FEDERALLY SPONSORED RESEARCH OR DEVELOPMENT

Not applicable

SEQUENCE LISTING

Not applicable

BACKGROUND OF THE INVENTION

1. Field of the Invention

The present disclosure relates to vehicle cabin vents or pressure relief devices, and more particularly, to pressure relief valve assemblies that relieve air pressure inside the interior of a vehicle.

2. Description of the Background of the Invention

Interior cabins of vehicles typically include cabin vents or pressure relief devices. Without such devices, air pressure inside the vehicle cabin could damage occupants' ear drums. For example, when a vehicle door is closed, air pressure within the vehicle needs to be relieved or the door will not close. Additionally, if an air bag is activated in a vehicle that does not have a venting or pressure relief device, an occupant's ear drum may be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water, or other contaminants into the enclosed area. Thus, pressure relief devices are, in essence, one-way valves or one-way check valves, and are configured to maintain a small amount of back pressure per customer specifications.

A conventional pressure relief device includes a plastic housing having a plurality of air passages. A light membrane is positioned over the air passages, and is configured to allow air to pass in one direction. In order to allow air to pass, the light membrane opens off of the main body in response to air flow. However, in some cases when air is passing out of the enclosed structure, the light membrane starts to flutter or slap against the housing. This may cause unwanted noise and may be uncomfortable for the driver and passengers. Further, such conventional devices also suffer from allowing debris to accumulate within various portions of the relief devices, as well as providing leak paths to allow air or liquid to infiltrate therein.

As such, a need exists to provide a pressure relief device that does not provide unwanted noise and that prevents the ingress of debris and fluids.

SUMMARY OF THE INVENTION

According to a first aspect, a pressure relief assembly includes a housing that comprises an air passage chamber and a membrane flap positioned within the air passage chamber. The pressure relief assembly further includes a plurality of clips that extend upwardly from the housing. The plurality of clips anchor the membrane flap to the housing. Further, the plurality of clips are staggered.

According to some embodiments, the membrane flap is rotatable about the plurality of clips. In another embodiment, the housing may comprise a venting wall that extends circumferentially around the air passage chamber, and the venting wall may be angled with respect to the housing. The plurality of clips may extend upwardly from an upper wall of the venting wall. In a different embodiment, at least two clips of the plurality of clips are offset from the remainder of the plurality of clips. The pressure relief assembly may define an open position when the membrane flap makes contact with a main body of the plurality of clips. The at least two clips of the plurality of clips can be offset to create a wave in the membrane flap when the pressure relief assembly is in the open position. In a further embodiment, each clip of the plurality of clips can comprise an arrowhead configuration that includes a first wing and a second wing that extend laterally from opposing sides of a main body. In other embodiments, the plurality of clips may be staggered by a distance of up to 5.0 mm.

According to another aspect, a pressure relief assembly comprises a housing that includes an air passage chamber with a plurality of openings that extend therethrough and a membrane flap positioned within the air passage chamber. The pressure relief assembly further includes a plurality of clips that extend upwardly from the housing, each clip having an arrowhead configuration. Each clip includes a main body and two opposing wings that extend laterally from the main body. Further, the membrane flap is retained within the housing by the plurality of clips, and the membrane flap is rotatable about the plurality of clips. The plurality of clips are also staggered.

In some embodiments, the two opposing wings of each of the clips of the plurality of clips may be offset from a front surface of the main body. The two opposing wings may further include an angled lead-in edge that extends downwardly and outwardly from a top end of the main body toward a bottom end of the main body. In a different embodiment, the membrane flap is retained between a venting wall of the housing and the two opposing wings of each clip of the plurality of clips. In a further embodiment, the pressure relief assembly defines an open position when the membrane flap makes contact with the main body of each clip of the plurality of clips, and the pressure relief assembly defines a closed position when the membrane flap is at rest in the housing. Further, at least one of the clips of the plurality of clips can be offset from the other clips of the plurality of clips. The membrane flap is partially deformed and stationary when in the open position. In another embodiment, the air passage chamber comprises a plurality of fins and ribs that bisect each other therein.

According to yet another aspect, a pressure relief assembly for relieving air pressure inside of an interior of a vehicle comprises a housing that includes an air passage chamber with a plurality of openings that extend therethrough. The pressure relief assembly further includes a membrane flap positioned within the air passage chamber. The membrane flap is positioned over the openings in a closed positon, and the membrane flap is rotatable to an open position, exposing the openings. Furthermore, the pressure relief assembly comprises a plurality of clips that extend upwardly from the housing. The membrane flap is retained within the housing and is rotatable about the housing by the plurality of clips.

At least two of the clips of the plurality of clips are aligned along a first axis and at least two of the clips of the plurality of clips are aligned along a second axis. The first axis is offset from the second axis. Additionally, a wave is formed in the membrane flap in the open positon by the plurality of clips.

In some embodiments, the membrane flap is stationary in the open position. In another embodiment, each of the clips of the plurality of clips may include a main body and two opposing wings that extend laterally from the main body. The two opposing wings may be offset from a first surface of the main body. In a different embodiment, the membrane flap may block debris or liquids from entering the air passage chamber when in the closed position.

BRIEF DESCRIPTION OF THE DRAWINGS

The present disclosure will be better understood and features, aspects, and advantages other than those set forth above will become apparent when consideration is given to the following detailed description thereof. Such detailed description makes reference to the following drawings.

Before the embodiments of the disclosure are explained in detail, it is to be understood that the disclosure is not limited in its application to the details of construction and arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Figure 1:
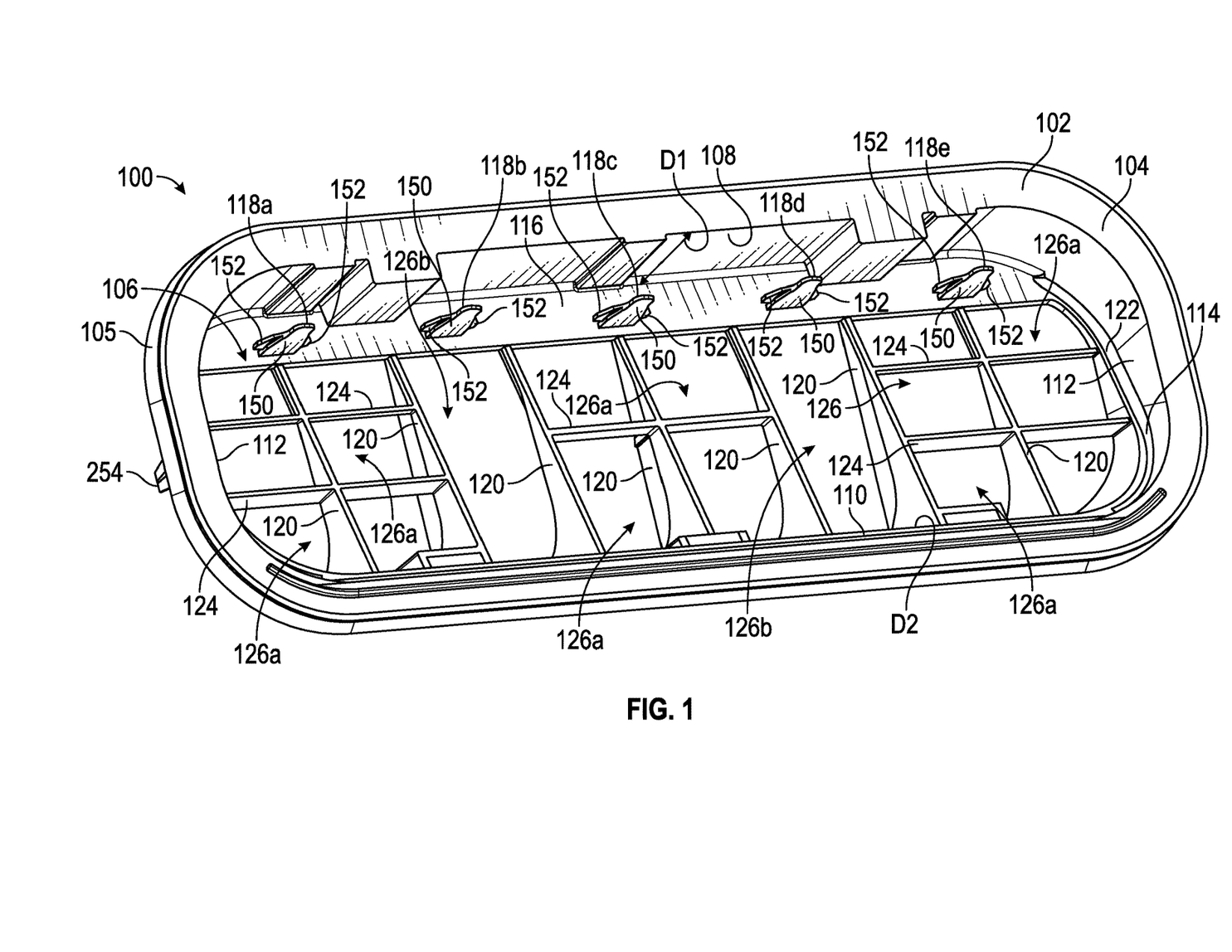
FIG. 1 illustrates a rear, angled isometric view of a housing of a pressure relief assembly.

The present invention is directed to a unique pressure relief valve assembly 100 that provides numerous advantages over prior art solutions. With reference to FIG. 1, the pressure relief assembly 100 is shown to include a frame or housing 102, which is adapted for securement to a portion of a vehicle interior. For example, in one embodiment, the housing 102 is secured within an opening formed in a panel of sheet material found in a vehicle.

Referring to FIG. 1, an isometric view of the pressure relief assembly 100 and the housing 102 is shown. The housing 102 generally comprises a peripheral rear wall 104 with an air passage chamber 106 provided therein. Further, the housing 102 includes a sealing ring 105 extending around the housing 102. The sealing ring 105 inhibits debris or liquids from getting in or out of the interior of the vehicle. In the present embodiment, the air passage chamber 106 is generally race-tracked shape, but may comprise alternative geometric shapes that may be regular, e.g., oval or rectangular, or irregular. In preferred embodiments, the air passage chamber 106 is generally defined by a top wall 108, a bottom wall 110, and opposing side walls 112, which together provide a depth to the chamber 106 and housing 102.

Referring still to FIG. 1, the housing 102 has a depth D1 adjacent the top wall 108, and which extends from the rear wall 104 to a venting wall 114, of about 5.0 mm to about 25.0 mm, and more particularly from about 13.6 mm to about 19.0 mm. Further, in the present embodiment, the housing 102 has a depth D2 adjacent the bottom wall 110, and which extends from the rear wall 104 to the venting wall 114, of about 0 mm to about 24.0 mm, and more particularly from about 0 mm to about 6.5 mm. Regardless, in the present implementation, the depth D1 is greater than the depth D2 by virtue of the angled venting wall 114. In alternative embodiments, the depth D1 and the depth D2 may be equal. Further, in other embodiments, the pressure relief assembly 100 may comprise more than one air passage chamber 106 extending through the housing 102. For example, the pressure relief assembly 100 may comprising three air passage chambers 106 positioned adjacent to each other.

The housing 102 may be formed of a plastic, such as acrylic, for example. In at least one embodiment, the housing 102 may be formed of polypropylene. Further, the housing 102 may be formed through a thermoforming process. In alternative embodiments, the housing 102 may be formed through an injection-molding process.

Referring still to FIG. 1, the venting wall 114 comprises an upper wall 116, with a plurality of clips 118 provided thereon that extend upwardly toward the peripheral rear wall 104. As will be discussed in further detail herein, the clips 118 are positioned in two alternating rows that are axially offset from each other (see FIG. 5). Therefore, every other clip 118 is aligned with one another on the same axis (see FIG. 5). Additionally, the venting wall 114 extends circumferentially around the air passage chamber 106 and further comprises a plurality of columns or fins 120 that extend from the upper wall 116 to the bottom wall 110. In alternative embodiments, the venting wall 114 may comprise a greater or fewer number of columns or fins 120 than shown in FIG. 1. Further, in the present embodiment, the fins 120 include a greater depth adjacent the bottom wall 110 as opposed to the top wall 108 or the upper wall 116. In fact, the venting wall 114 itself may extend the same distance as the fins 120, i.e., have a similar depth, adjacent the top and bottom walls 108, 110, to form a step 122 provided within the air passage chamber 106. Additionally, the angle of the venting wall 114 relative to the rear wall 104 may vary based on a desired amount of flap resistive force. In one alternative embodiment, the air venting wall 114 may be coplanar with a flat front side of the housing 102, instead of being angled. Furthermore, in other embodiments, the air venting wall 114 may be disposed at any depth inside the air passage chamber 106.

Referring again to FIG. 1, the venting wall 114 further includes a plurality of horizontal ribs 124 that bisect several of the fins 120. In the present embodiment, the intersection of the fins and ribs 120, 124 create a plurality of openings 126, of which several are minor openings 126a and some are major openings 126b. The ribs 124 extend from the venting wall 114 near the opposing side walls 112 of the air passage chamber 106. Additionally, some of the ribs 124 are disposed in the middle of the air passage chamber 106 between the fins 120. In preferred embodiments, the ribs 124 help to reinforce the fins 120 that they intersect.

Figure 2:
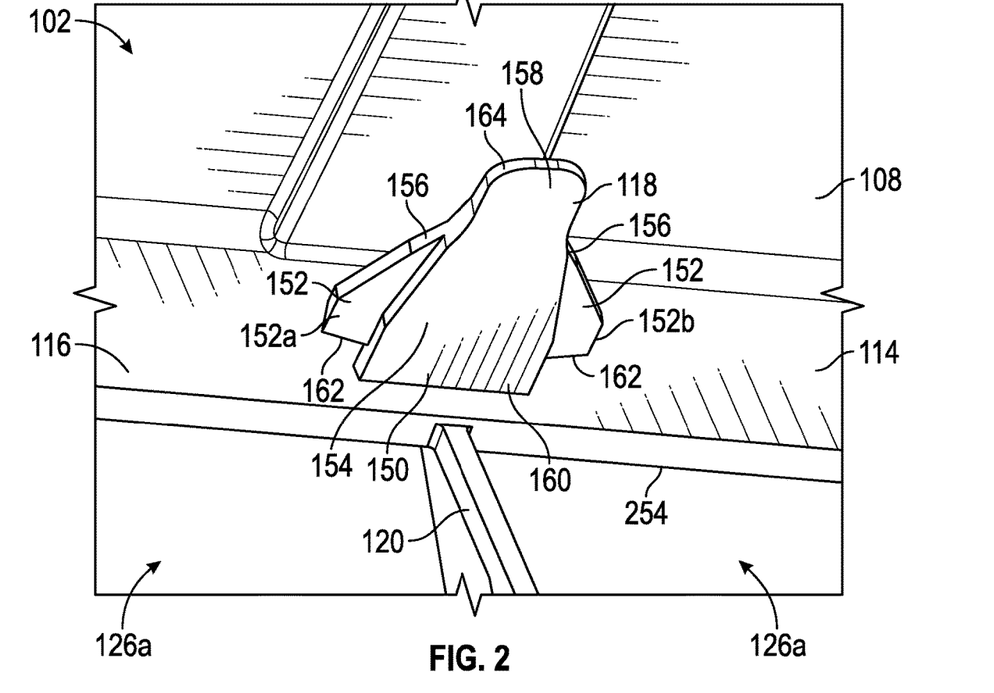
FIG. 2 illustrates a front isometric view of a retaining clip secured to the housing of the pressure relief assembly of FIG. 1.

Referring to FIG. 2, a preferred construction of the clip 118 is shown, which may comprise any of the staggered clips 118. As illustrated in FIG. 2, the clips 118 extend outwardly from the upper wall 116 of the venting wall 114. The clips 118 generally have an arrowhead configuration and include a main body 150 and opposing wings 152, which comprise first and second wings 152a, 152b that extend laterally from the main body 150. The wings 152a, 152b are offset from a front surface 154 of the main body 150. Each wing 152a, 152b includes an angled lead-in edge 156, such as a chamfered or other such beveled edge, which extends downwardly and outwardly from a top end 158 of the main body 150 toward a bottom end 160. Further, bottom edges 162 of the wings 152a, 152b are spaced from the upper wall 116 such that a void exists between the bottom edges 162 of the wings 152a, 152b and the upper wall 116 of the venting wall 114. The wings 152a, 152b further include a rounded tip 164 provided at the top end 158 of the main body 150 that provides a flap alignment function. In alternative embodiments, the clips 118 may comprise any shaped wings 152a, 152b extending outwardly from the main body 150.

Figure 3:
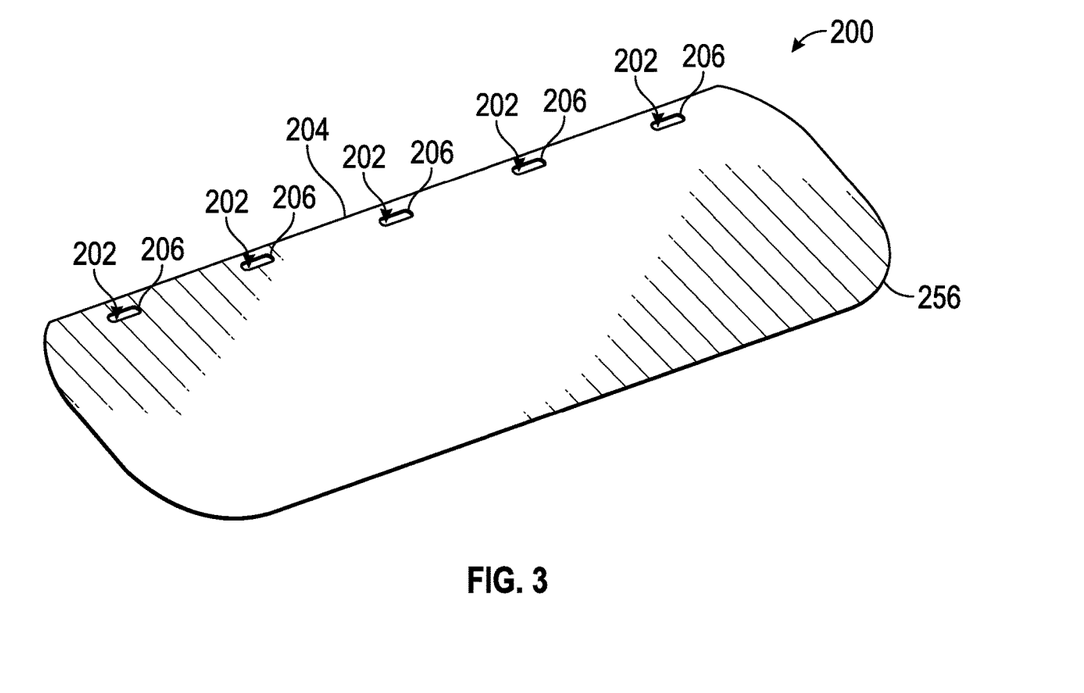
FIG. 3 illustrates a rear, angled isometric view of a membrane flap.

Referring to FIG. 3, a membrane flap 200 is shown. The membrane flap 200 comprises a generally race-track configuration that aligns and matches with the air passage chamber 106. In alternative embodiments, the membrane flap 200 may comprise any shape such that it may align with the air passage chamber 106. Further, the membrane flap 200 includes a plurality of slots 202 positioned adjacent a top edge 204 of the flap 200 that are aligned with each of the clips 118. As will be discussed in further detail herein, the slots 202 are axially set in two rows, alternate to each other to match the position of the clips 118. Internal edges 206 of the slots 202 define the shape thereof, which in the present embodiment is substantially race-track shaped, however, the shape may comprise any configuration to match with the clips 118. In a closed, at-rest position, the membrane flap 200 (see FIG. 4) is positioned over the openings 126. In alternative embodiments, the membrane flap 200 may comprise a greater or smaller thickness than shown in FIG. 3. For example, the membrane flap 200 may be thinner to reduce the overall weight of the pressure relief assembly 100. Moreover, the membrane flap 200 may be formed from a flexible thermoplastic elastomer, such as polypropylene, Hytrel®, Lexan™, Tyvek® or Mylar®, a rubber (such as EPDM rubber), and the like.

Referring to FIGS. 1-3, in order to secure the membrane flap 200 to the housing 102, the slots 202 are aligned with the clips 118. The membrane flap 200 is then urged onto the clips 118, so that the rounded tips 164 interact with internal edges 206 of the membrane flap 200. Upon urging of the membrane flap 200, the rounded tips 164 guide the membrane flap 200 into a centered position with respect to the retaining clips 118 by abutting against the internal edges 206 that define the slots 202. With continued urging of the membrane flap 200 toward the upper wall 116, the edges 206 of the slots 202 slide over the wings 152, which cause the slots 202 to expand, due to the increasing angle of the lead-in edges 156 between the opposed flap-retention wings 152. As the internal edges 206 of the slots 202 ride over the bottom ends 160 of the clips 118, the internal edges 206 flex back to an at-rest position, and hook underneath the bottom edges 162 of the clips 118. As such, the internal edges 206 that define the slots 202 are trapped between the bottom edges 162 of the wings 152 and the upper wall 116, thereby securing the membrane flap 200 to the housing 102.

Figure 4:
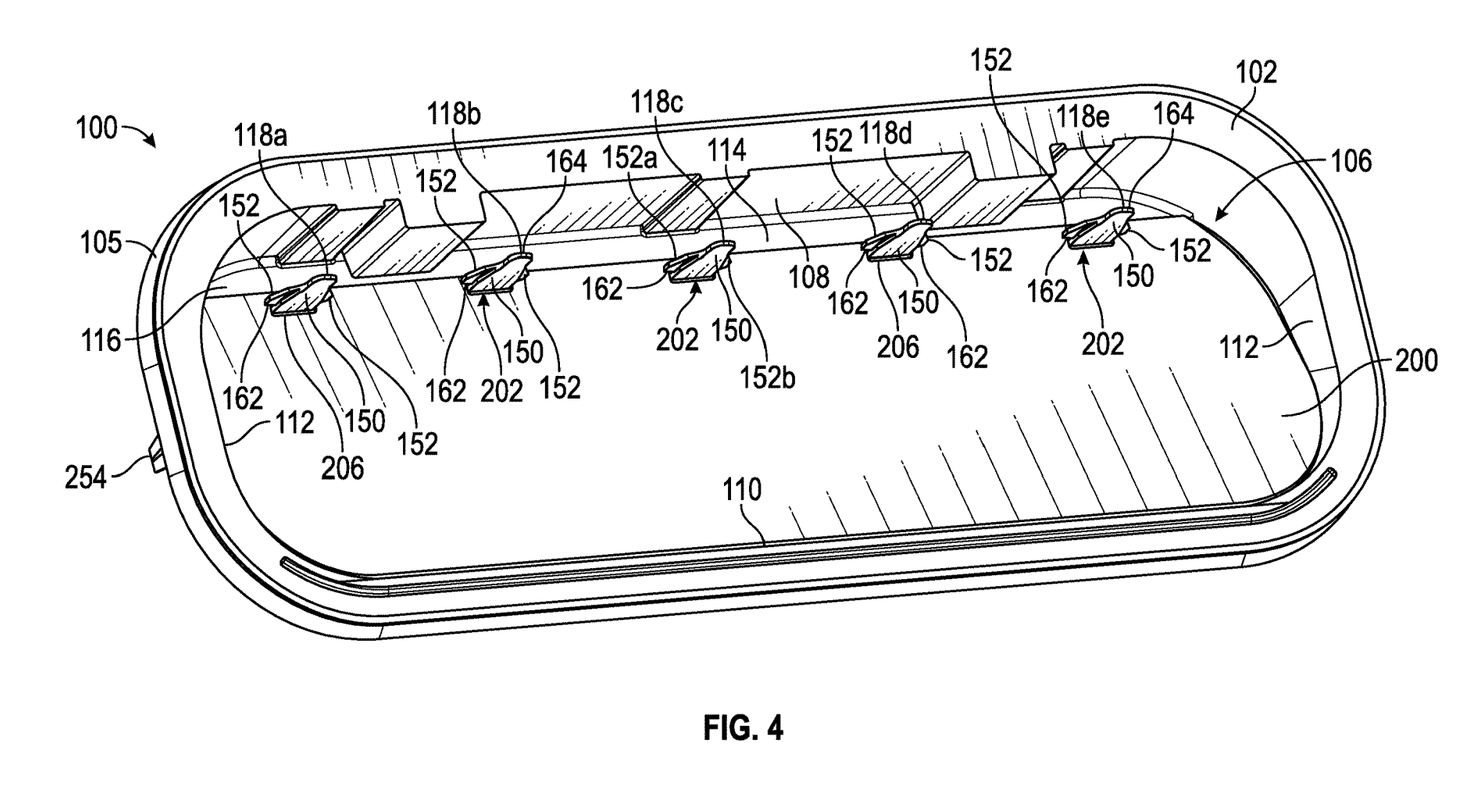
FIG. 4 illustrates a rear, angled isometric view of the pressure relief assembly of FIG. 1 with the membrane flap of FIG. 3.
Figure 5:
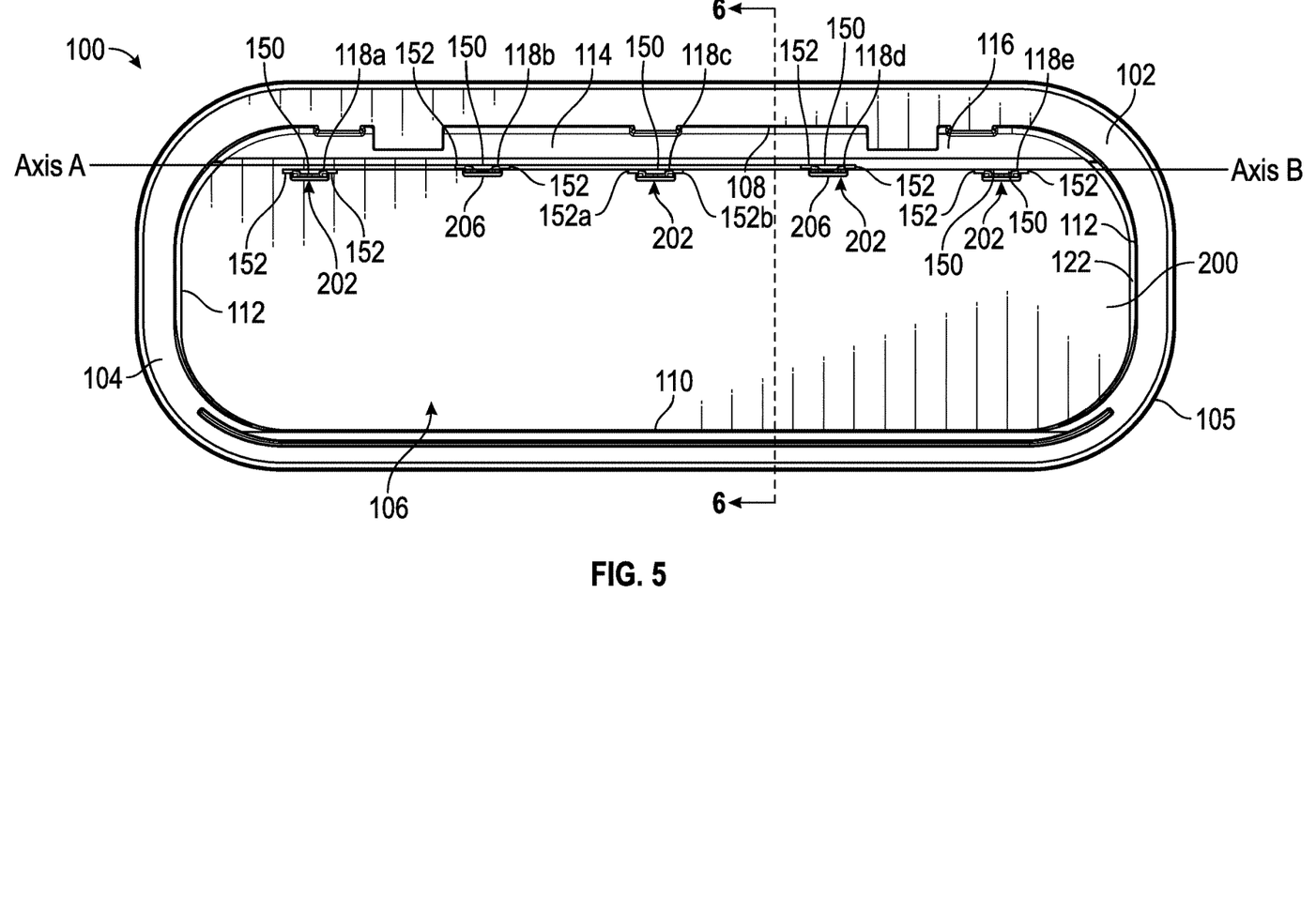
FIG. 5 illustrates a rear elevational view of the pressure relief assembly of FIG. 4.

Referring to FIGS. 4 and 5, the pressure relief assembly 100 is shown with the membrane flap 200 attached to the housing 102 and positioned within the air passage chamber 106. The membrane flap 200 is illustrated in the at-rest position, laying against the venting wall 114. In the at-rest or closed position, the membrane flap 200 covers the openings 126 of the air passage chamber 106, thereby blocking the air passage chamber 106. Additionally, the membrane flap 200 is positioned on the fins 120 and the horizontal ribs 124 that extend across the air passage chamber 106. The fins 120 and the ribs 124 help support the membrane flap 200 in the at-rest position. Additionally while in the at-rest or closed position, the membrane flap 200 blocks debris or liquids from entering through the air passage chamber 106 of the housing 102.

Referring still to FIGS. 4 and 5, each membrane flap 200 is anchored to the housing 102 adjacent the upper wall 116 by one or more clips 118. In the present embodiment, two of the clips 118b, 118d are aligned along an axis A and three of the clips 118a, 118c, 118e are aligned along an axis B to stagger the clips 118b, 118d with respect to the clips 118a, 118c, 118e, as may be more clearly seen in FIG. 5. As illustrated in FIG. 5, the axis A and the axis B are slightly offset from each other. However, in alternative embodiments, the clips 118 may be staggered by any distance and may be adjusted based on the need of the vehicle. In other words, the pressure relief assembly 100 is designed or configured for the specific vehicle that the pressure relief assembly 100 is intended to be inserted therein.

In the installed position, as shown in FIGS. 4 and 5, a portion of the membrane flap 200 is configured to be captured between the upper wall 116 and the bottom edges 162 of the wings 152. As such, the membrane flap 200 is securely retained within the housing 102 by the clips 118. As may also be seen, the staggered clips 118 extend through the plurality of slots 202, which are likewise staggered in a similar manner as the corresponding clips 118. Each slot 202 has a length that is less than a distance between terminal edges of the wings 152a, 152b of the clip 118 (see FIG. 2).

Figure 6:
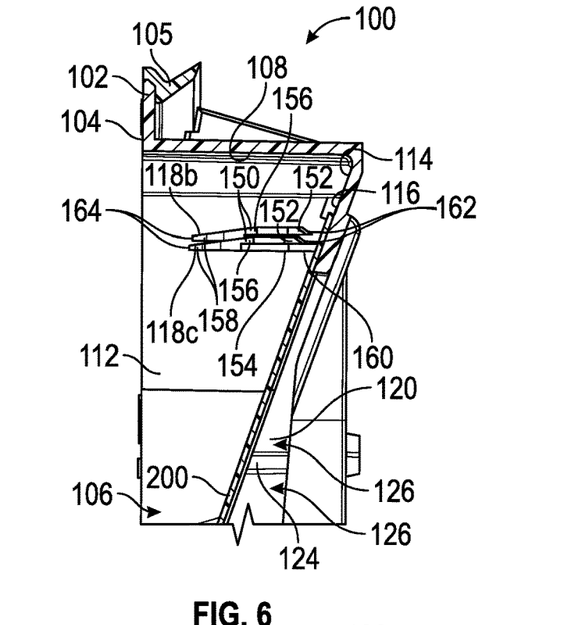
FIG. 6 illustrates a partial side, cross-sectional view taken along lines 6-6 of the pressure relief assembly of FIG. 5.

Turning to FIG. 6, a partial cross-sectional view of the housing 102 is provided, which depicts with greater clarity how the clips 118 are provided in a staggered manner. As illustrated in FIG. 6, the clip 118b is located above the clip 118c, i.e., clip 118b is located closer to the top wall 108. As illustrated in FIGS. 5 and 6, the distance between the axis A and the axis B helps to determine the shape of the flap 200 when it is converted to an open positon (see FIG. 7). Therefore, the greater the distance between the two axes, the more shape the flap 200 will have. Put differently, a greater distance between the two axes will result in the wave 300 being more defined and comprising a greater amplitude and wave height, i.e., the membrane flap 200 will be more deformed. Although the clips 118 may be staggered by any distance, in preferred embodiments, the clips 118 may be staggered by a distance of about 0.25 mm to about 5.0 mm. In one embodiment, the clips 118 may be staggered by a distance of up to approximately 5.0 mm. Further, in the present implementation at least two clips 118 are positioned in a misaligned manner. However, in alternative embodiments, a greater or fewer number of clips 118 may be positioned in the misaligned manner than illustrated. Further, in other embodiments, the pressure relief assembly 100 may comprise more than two axially aligned rows of clips 118.

Figure 7:
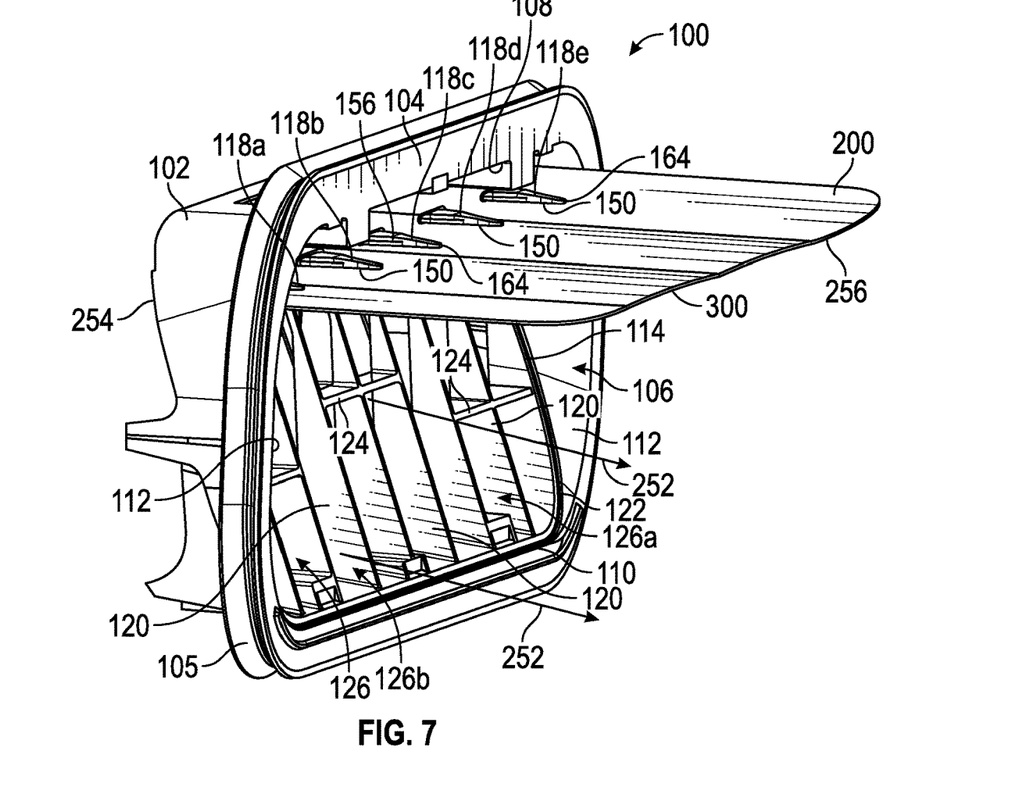
FIG. 7 illustrates a rear, side isometric view of the pressure relief assembly of FIG. 4 with the membrane flap in an open position.
Figure 8:
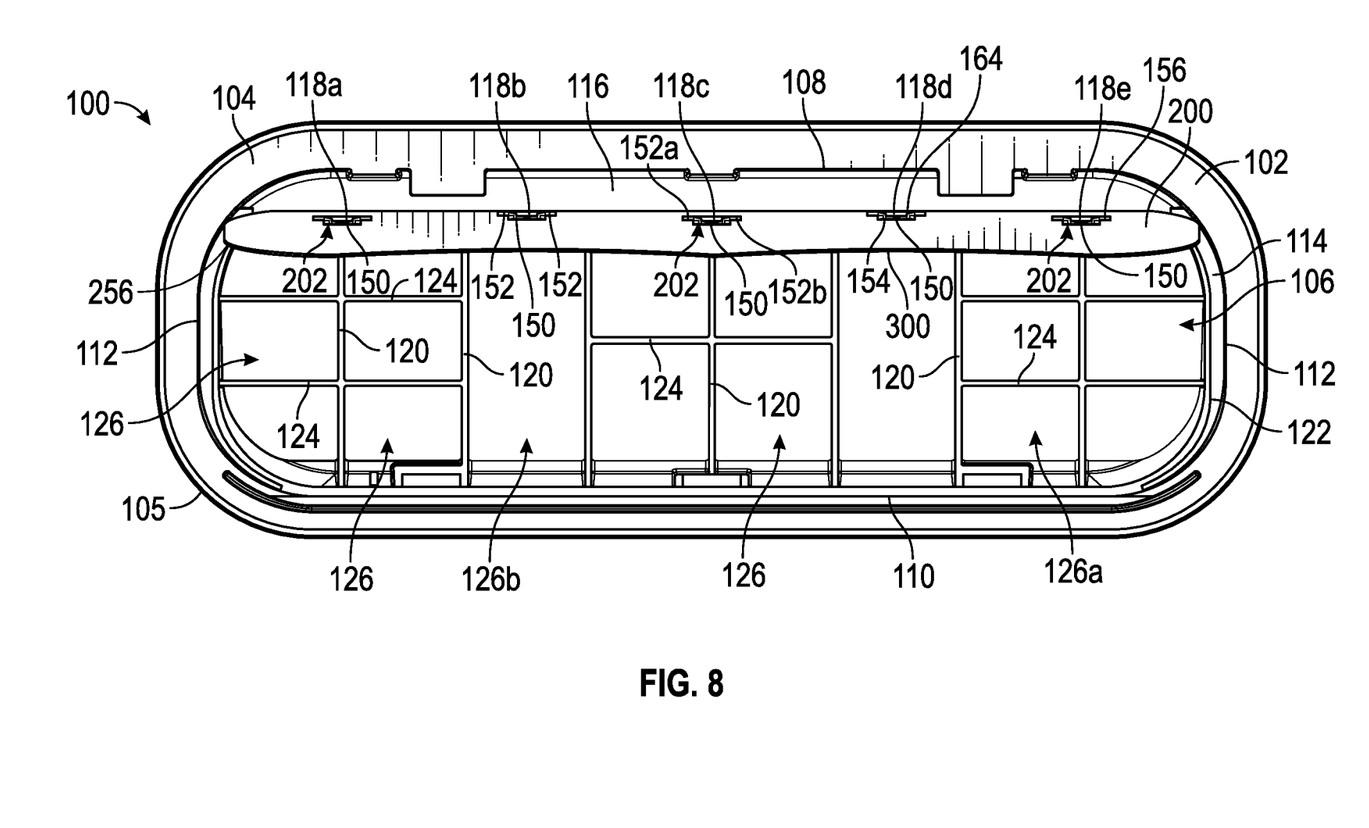
FIG. 8 illustrates a rear view of the pressure relief assembly of FIG. 7.

Referring to FIGS. 7 and 8, the pressure relief assembly 100 is shown in an open position. Initially, the membrane flap 200 is in the closed position, secured to the housing 102 (see FIGS. 4 and 5). However, once the air pressure exceeds a predetermined magnitude, air 252 pushes through on a front side 254 of the housing 102. As a result, the air 252 moves through the openings 126 and against a front side 256 of the membrane flap 200. As the air 252 is pushed against the front side 256 of the membrane flap 200, the membrane flap 200 starts to rotate about the clips 118 within the slots 202 of the membrane flap 200. With a continued buildup of air pressure, the membrane flap 200 will continue to rotate upwards toward the top wall 108 of the air passage chamber 106. Further, the membrane flap 200 will rotate about the clips 118 until the membrane flap 200 makes contact with the main body 150 of the clips 118. Once the membrane flap 200 makes contact with the clips 118, the membrane flap 200 is in a fully open position. Additionally, once in a fully open position, the air 252 may then move out of the pressure relief assembly 100, thereby relieving air pressure from within the vehicle.

Referring still to FIGS. 7 and 8, once the pressure relief assembly 100 is in a fully open position, a wave 300 is formed in the membrane flap 200. The wave 300 is formed by the staggered clips 118a-118e. For example, with reference to FIGS. 2, 5, 7, and 8, the different positions of the clips 118a-118e cause an S-shaped wave 300 to form in the membrane flap 200. The wave 300 is a result of the membrane flap 200 being deformed when making contact with the staggered clips 118a-118e at different axial positions. Further, the wave 300 formed in the membrane flap 200 causes the flap to hold substantially stationary in a fully open position as the air 252 travels through the openings 126. As a result of this stability, the membrane flap 200 does not flap or slap against the housing 102. Rather, the membrane flap 200 stays steady against the clips 118a-118e, thereby reducing the noise emanating from the pressure relief assembly 100. This reduction of noise helps to improve the comfort of the driver and passengers. In alternative embodiments, the pressure relief assembly 100 may form a different shape wave 300 than illustrated in FIG. 7. Further, depending on the placement of axis A and axis B (see FIG. 5), the shape of the wave 300 on the membrane flap 200 may be greater or smaller than shown. For example and as discussed above, the greater the distance between axis A and axis B will result in the membrane flap 200 having a more defined shape, i.e., the wave 300 will have a greater wave height and wave amplitude. Therefore, greater distances between the axis A and the axis B will result in a greater deformation of the membrane flap 200, which results in the pressure relief assembly 100 having more resistance to fluttering.

Figure 9:
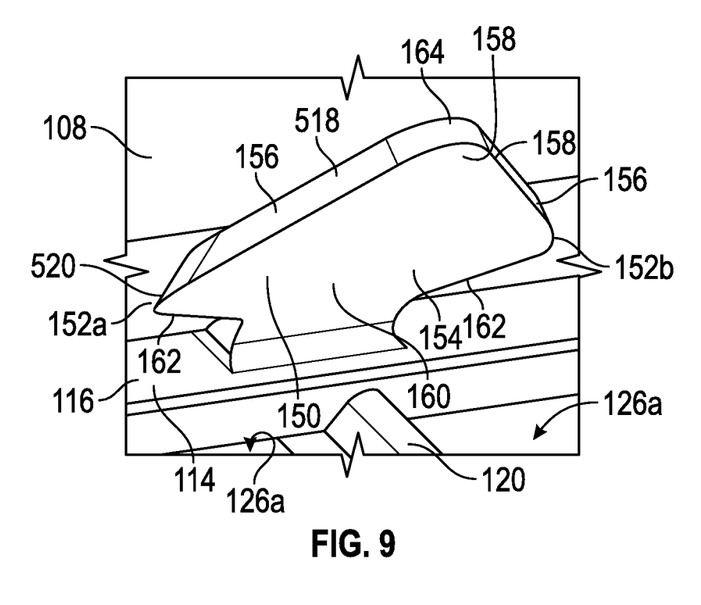
FIG. 9 illustrates a front perspective view of a retaining clip according to another embodiment of the present disclosure.

With reference to FIG. 9, like reference numbers are used with regard to another embodiment of a clip 518, which may comprise any of the staggered clips 118. As a result, the clip 518 may be placed in the pressure relief assembly 100 instead of the clips 118a-118e. The clip 518 is comprised of a spade-shaped member extending from the upper wall 116. As illustrated in FIG. 9, the angled lead-in edge 156 extends from the rounded tip 164 located at the top end 158 of the main body 150 all the way to the wings 152a, 152b.

Additionally, the wings 152a, 152b include an angled side wall 520 that extends inwardly from the front surface 154 of the main body 150. In fact, the shape of the clips 118, 518 may vary in any number of ways insofar as the chosen configuration allows the clips 118, 518 to hold the membrane flap 200 (see FIG. 2) between the upper wall 116 and the bottom edges 162 of the wings 152a, 152b.

As discussed above, the clips 118, 518 are offset or staggered from each other to help reduce slapping and fluttering of the membrane flap 200 against the housing 102 of the pressure relief assembly 100. Therefore, the clips 118, 518 hold the membrane flap 200 in a stationary position when the pressure relief assembly 100 is relieving air pressure in the vehicle. This configuration improve the comfort of a driver and passenger within the vehicle.

While various spatial and directional terms, such as front, rear, top, bottom, lateral, horizontal, and the like may be used to describe embodiments of the present disclosure, it is understood that such terms are merely used with respect to the orientations shown in the drawings and are not limiting. The orientations may be inverted, rotated, or otherwise changed, such that a rear portion is a front portion, and vice versa, upper becomes bottom, and the like. For one example, this application has been written as if the pressure relief assembly 100 has been placed at the rear of the vehicle.

The term "about," as used herein, refers to variation in the numerical quantity that may occur, for example, through typical measuring and manufacturing procedures for embodiments of the disclosure herein. Throughout the disclosure, the terms "about" refer to a range of values ±5% of the numeric value that the term precedes.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A pressure relief assembly, comprising:
a housing comprising an air passage chamber;
a membrane flap positioned within the air passage chamber; and
a plurality of clips extending outwardly from the housing, wherein the plurality of clips anchor the membrane flap to the housing,
wherein at least two of the plurality of clips are aligned along a first axis and at least two of the plurality of clips are aligned along a second axis, and wherein the first axis is offset from the second axis.

2. The pressure relief assembly of claim 1, wherein the membrane flap is rotatable about the plurality of clips.

3. The pressure relief assembly of claim 1, wherein the housing comprises a venting wall extending circumferentially around the air passage chamber, and wherein the venting wall is angled with respect to a surface of the housing.

4. The pressure relief assembly of claim 3, wherein the plurality of clips extend outwardly from an upper wall of the venting wall.

5. The pressure relief assembly of claim 1, wherein the pressure relief assembly defines an open position when the membrane flap makes contact with a main body of each of the plurality of clips.

6. The pressure relief assembly of claim 5, wherein the plurality of clips create a wave in the membrane flap when the pressure relief assembly is in the open position.

7. The pressure relief assembly of claim 1, wherein each clip of the plurality of clips have an arrowhead configuration comprising a first wing and a second wing that extend laterally from opposing sides of a main body.

8. The pressure relief assembly of claim 1, wherein the first axis is offset from the second axis by a distance of up to 5.0 mm.

9. A pressure relief assembly, comprising:
a housing comprising an air passage chamber with a plurality of openings extending therethrough;
a membrane flap positioned within the air passage chamber, wherein the membrane flap is positioned over the plurality of openings in a closed position, and the membrane flap is rotatable to an open position, exposing the plurality of openings; and
a plurality of clips extending outwardly from the housing, each clip having a main body and two opposing wings extending laterally from the main body, wherein the membrane flap is retained within the housing and is rotatable about the plurality of clips, and
wherein the membrane flap is substantially flat in the closed position, and wherein a wave is formed in the membrane flap in the open position by the plurality of clips.

10. The pressure relief assembly of claim 9, wherein the two opposing wings of each of the clips of the plurality of clips are offset from a front surface of the main body.

11. The pressure relief assembly of claim 10, wherein the two opposing wings include an angled lead-in edge that extends downwardly and outwardly from a top end of the main body toward a bottom end of the main body.

12. The pressure relief assembly of claim 9, wherein the membrane flap is retained between a venting wall of the housing and the two opposing wings of each clip of the plurality of clips.

13. The pressure relief assembly of claim 9, wherein the pressure relief assembly defines the open position when the membrane flap makes contact with the main body of each clip of the plurality of clips, and the pressure relief assembly defines the closed position when the membrane flap is at rest in the housing.

14. The pressure relief assembly of claim 13, wherein at least one of the clip of the plurality of clips is offset from another clip of the plurality of clips.

15. The pressure relief assembly of claim 14, wherein the membrane flap is partially deformed and stationary when in the open position.

16. The pressure relief assembly of claim 9, wherein a venting wall extends circumferentially around the air passage chamber, and wherein the venting wall comprises a plurality of fins and ribs.

17. A pressure relief assembly for relieving air pressure inside an interior of a vehicle, the pressure relief assembly comprising:
a housing comprising an air passage chamber with a plurality of openings extending therethrough;
a membrane flap positioned within the air passage chamber, wherein the membrane flap is positioned over the plurality of openings in a closed position, and the membrane flap is rotatable to an open position, exposing the plurality of openings;
a plurality of clips extending outwardly from the housing, and wherein the membrane flap is retained within the housing and is rotatable about the plurality of clips; and
at least two of the plurality of clips are aligned along a first axis and at least two of the clips of the plurality of clips are aligned along a second axis, wherein the first axis is offset from the second axis,
wherein a wave is formed in the membrane flap in the open position by the plurality of clips.

18. The pressure relief assembly of claim 17, wherein the membrane flap is stationary in the open position.

19. The pressure relief assembly of claim 17, wherein each of the clips of the plurality of clips include a main body and two opposing wings extending laterally from the main body, and wherein the two opposing wings are offset from a front surface of the main body.

20. The pressure relief assembly of claim 17, wherein the membrane flap blocks debris or liquids from entering the air passage chamber when in the closed position.

21. The pressure relief assembly of claim 17, wherein the wave is formed in the open position when the membrane flap makes contact with a main body of at least two of the plurality of clips.

* * * * *